Oct. 3, 1950  E. E. WHITE  2,524,370

FISH LURE

Filed Nov. 25, 1947

INVENTOR.
ELLIS E. WHITE
BY
Cook & Robinson
ATTORNEYS

Patented Oct. 3, 1950

2,524,370

UNITED STATES PATENT OFFICE 2,524,370

FISH LURE

Ellis E. White, Bremerton, Wash.

Application November 25, 1947, Serial No. 787,935

2 Claims. (Cl. 43—42.48)

This invention relates to fish lures, and it has reference more particularly to lures of those types known as "plugs," designed for use in catching such game fish as salmon, trout, bass and other kinds of fish that feed upon or are attracted by minnows, herring and other small fish and which can be attracted by bait that simulates the swimming action of a crippled minnow or herring.

It is the principal object of this invention to provide improvements in the plug which was described and illustrated in my co-pending application filed on April 19, 1946, under Serial No. 663,262, particularly in the design and surface characteristics of the nose end of the plug, whereby the plug when pulled through the water as in trolling, is caused to simulate the swimming actions of a crippled minnow, in that it will alternately produce a normal swimming action and then a sidewise swimming action.

More specifically stated, the objects of the present invention reside in the novel details embodied in the nose or nose surface of the plug and the method of shaping or forming this surface.

In accomplishing the above mentioned and other objects of the invention, later apparent, I have provided the improved details of construction, the preferred forms of which are illustrated in the accompanying drawings, wherein—

Figure 1:
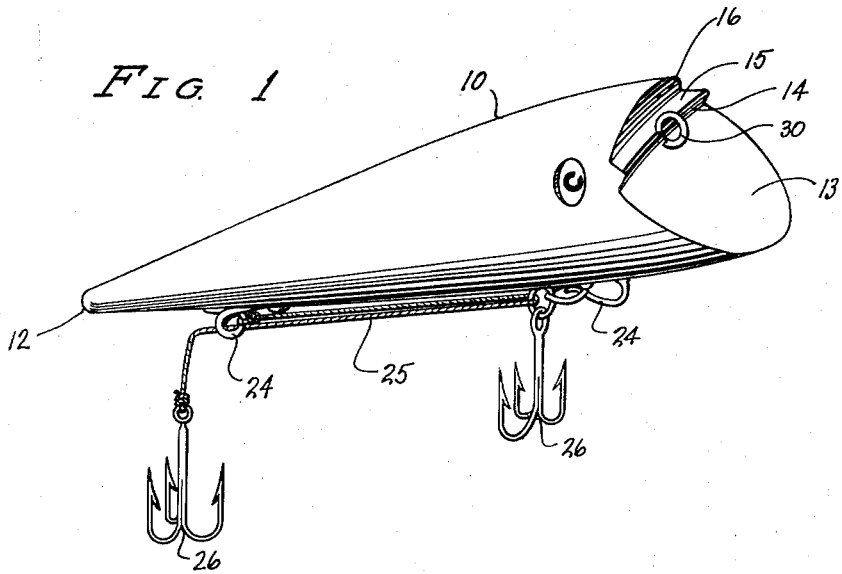
Fig. 1 is a perspective view of a fish lure or plug embodying the improvements of the present invention therein.

Referring more in detail to the drawings—

The present lure comprises a plug designated in its entirety by reference numeral 10, having an elongated body which may be wood, plastic or other suitable material, round in cross-section and gradually tapered along its rearward end portion and terminating in a rounded point 12 at its forward, or front end, the body 10 has a flat end surface 13, which is formed by cutting the body at an angle; the angle of the cut being approximately 45° with respect to the axial line of the plug, and it forms a sloping surface extending from the bottom side of the plug, rearwardly and upwardly approximately two-thirds the distance through the body, and is bounded across the top edge of this flat surface 13 with a forwardly and downwardly facing shoulder 14 that is perpendicular to the plane of the surface 13. Above the plane of the surface 13 is a second inclined or beveled surface designated at 15. This surface extends from shoulder 14 upwardly and terminates short of the upper surface of the plug in an abrupt downwardly and forwardly facing surface or shoulder 16. The surface 16 is perpendicular to the plane of surface 15.

Figure 2:
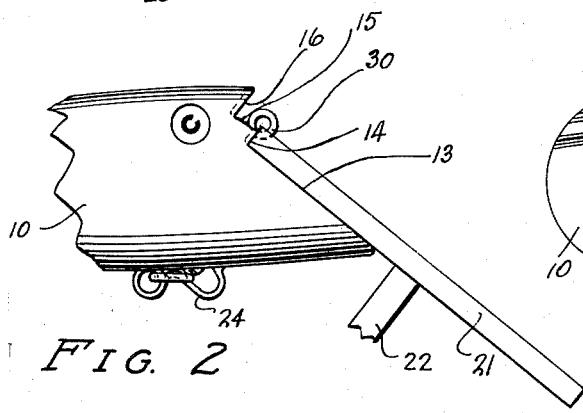
Fig. 2 is a side view of the nose end portion of the plug, showing the stepped arrangement of inclined surfaces on the forward end of the body.
Figure 3:
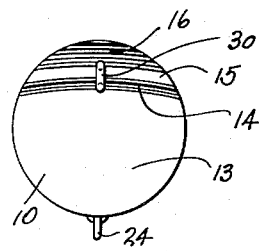
Fig. 3 is a forward end elevation of the plug.
Figure 4:
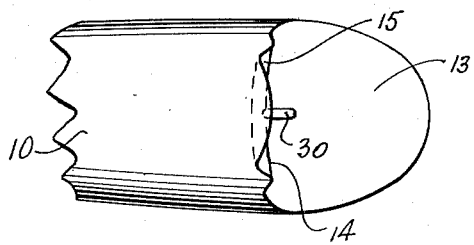
Fig. 4 is a top view of that part of the plug shown in Fig. 2.

The preferred means for forming these forward end surfaces 13 and 15 of the plug comprises a disk saw of about four inches in diameter, to which the plug is applied at the desired angle. In Fig. 2 I have indicated by a numeral 21 a disk saw on a drive shaft 22. By cutting into the plug blank, then stepping it down to the thickness of the cut and making a second cut, the two surfaces 15 and 13 will be formed, as will also the shoulders 14 and 16. The surfaces 13 and 15 will be parallel to each other and the shoulders will be perpendicular thereto and inwardly rounded in accordance with the curvature of the peripheral edge of the saw.

Applied to the plug along its under side are rings, clips or other suitable means, as at 24, for the securement of a line 25 and hooks 26. However, hooks might be attached in any other suitable manner. Applied to the forward end surface of the plug in the central plane and at the level of the lower shoulder 14, is an eyelet 30 to which a fish line or leader would be attached.

By so forming the nose or forward end of the plug with the flat, rearwardly and upwardly sloping surfaces, and by providing at the top of the plug, the two shoulders 14 and 16, the novel and desired action, simulating the swimming of a crippled minnow or herring, results.

It is not desired to limit the claims to the process of or means for making the plug, but to base the claims on the structure of the plug itself, characterized by the rearwardly and upwardly sloping, offset surfaces 13 and 15, and the arcuately curved shoulders 14 and 16, located near the top of the plug and perpendicular to the sloping surfaces.

Such plugs may be made in various sizes and proportions, but the shape as illustrated in Fig. 1 is now most desirable.

Having thus described my invention, what I claim as new therein and desire to secure by Letters Patent is:

1. A fish lure of plug type having its forward end beveled to form a flat, upwardly and rearwardly sloping surface extending from the bottom edge of the plug to above the axial line, a shoulder formed across the said beveled end and providing, on its under side, a forwardly and upwardly sloping surface continuing from the top edge of said rearwardly, sloping flat surface, and providing on its top side a rearwardly and upwardly sloping surface, and said plug having a rearwardly and downwardly beveled surface across its top edge merging into the back edge of the top surface of said transverse shoulder, and a line attaching eye applied to the forward end of the plug in the shoulder forming portion and in the vertical axial plane of the plug.

2. A fish lure as recited in claim 1 wherein the forwardly and upwardly sloping shoulder surfaces are upwardly arched between their ends.

ELLIS E. WHITE.

REFERENCES CITED

The following references are of record in the file of this patent:

UNITED STATES PATENTS

| Number | Name | Date |
| --- | --- | --- |
| 2,100,289 | Khoenle | Nov. 23, 1937 |
| 2,256,173 | Schechterle | Sept. 16, 1941 |